US006985758B2

(12) United States Patent
Rankin

(10) Patent No.: US 6,985,758 B2
(45) Date of Patent: Jan. 10, 2006

(54) MOBILE DEVICE POWER SAVING

(75) Inventor: Paul J. Rankin, Horley (GB)

(73) Assignee: Koninklijke Philips Electronics N.V., Eindhoven (NL)

( * ) Notice: Subject to any disclaimer, the term of this patent is extended or adjusted under 35 U.S.C. 154(b) by 351 days.

(21) Appl. No.: 10/323,228

(22) Filed: Dec. 18, 2002

(65) Prior Publication Data
US 2003/0119504 A1  Jun. 26, 2003

(30) Foreign Application Priority Data
Dec. 22, 2001 (GB) .................... 0130800

(51) Int. Cl.
H04B 1/38 (2006.01)
(52) U.S. Cl. ............... 455/574; 455/572; 370/311
(58) Field of Classification Search ........... 455/574, 455/572, 575.1, 456.1, 456.6, 434, 161.3, 455/226.2, 134, 343.2, 456.3, 456.4, 421, 455/422.1, 550.1; 370/311; 340/7.32, 825.49, 340/539.3
See application file for complete search history.

(56) References Cited

U.S. PATENT DOCUMENTS

| | | | |
|---|---|---|---|
| 5,794,146 A | | 8/1998 | Sevcik et al. ............... 455/434 |
| 5,799,256 A | * | 8/1998 | Pombo et al. ............... 455/574 |
| 6,067,460 A | * | 5/2000 | Alanara et al. .............. 455/574 |
| 6,233,448 B1 | * | 5/2001 | Alperovich et al. ........ 455/417 |
| 6,452,912 B1 | * | 9/2002 | Leem ........................ 370/335 |
| 6,483,815 B1 | * | 11/2002 | Laurent et al. ............. 370/318 |
| 6,847,823 B2 | * | 1/2005 | Lehikoinen et al. ...... 455/456.1 |
| 2004/0204184 A1 | * | 10/2004 | Lin ............................ 455/574 |

FOREIGN PATENT DOCUMENTS

| | | |
|---|---|---|
| EP | 1024628 A1 | 1/1999 |
| GB | 2305825 A | 4/1997 |
| WO | WO9529410 | 11/1995 |
| WO | WO9962285 | 12/1999 |
| WO | WO0069186 | 11/2000 |

OTHER PUBLICATIONS

By Christian Rohl et al. Entitled: A Short Look on Power Saving Mechanisms in the Wireless LAN Standard Draft IEEE 802.11. WINLAB Workshop on 3$^{rd}$ Generation Wireless Information Networks, Piscataway, NJ, 1997, Technical University Berlin, Telecommunication Networks Group, pp. 183-188, no month.

* cited by examiner

Primary Examiner—Sonny Trinh
(74) Attorney, Agent, or Firm—Peter Zawilski

(57) ABSTRACT

A method is provided for power saving in a mobile device (10) for use in conjunction with a plurality of beacon devices (12, 14, 20), together with devices for use in such systems. The mobile device detects and receives data from such beacon devices including a first one of said beacon devices when the mobile device is at a first location within a first predetermined distance from said first one of said beacon devices. The mobile device is equipped to detect movement thereof and, having detected the first one of said beacon devices, the mobile device is disabled from detecting such beacon devices until said device has determined that it has moved from said first location.

9 Claims, 1 Drawing Sheet

MOBILE DEVICE POWER SAVING

Figure 1:
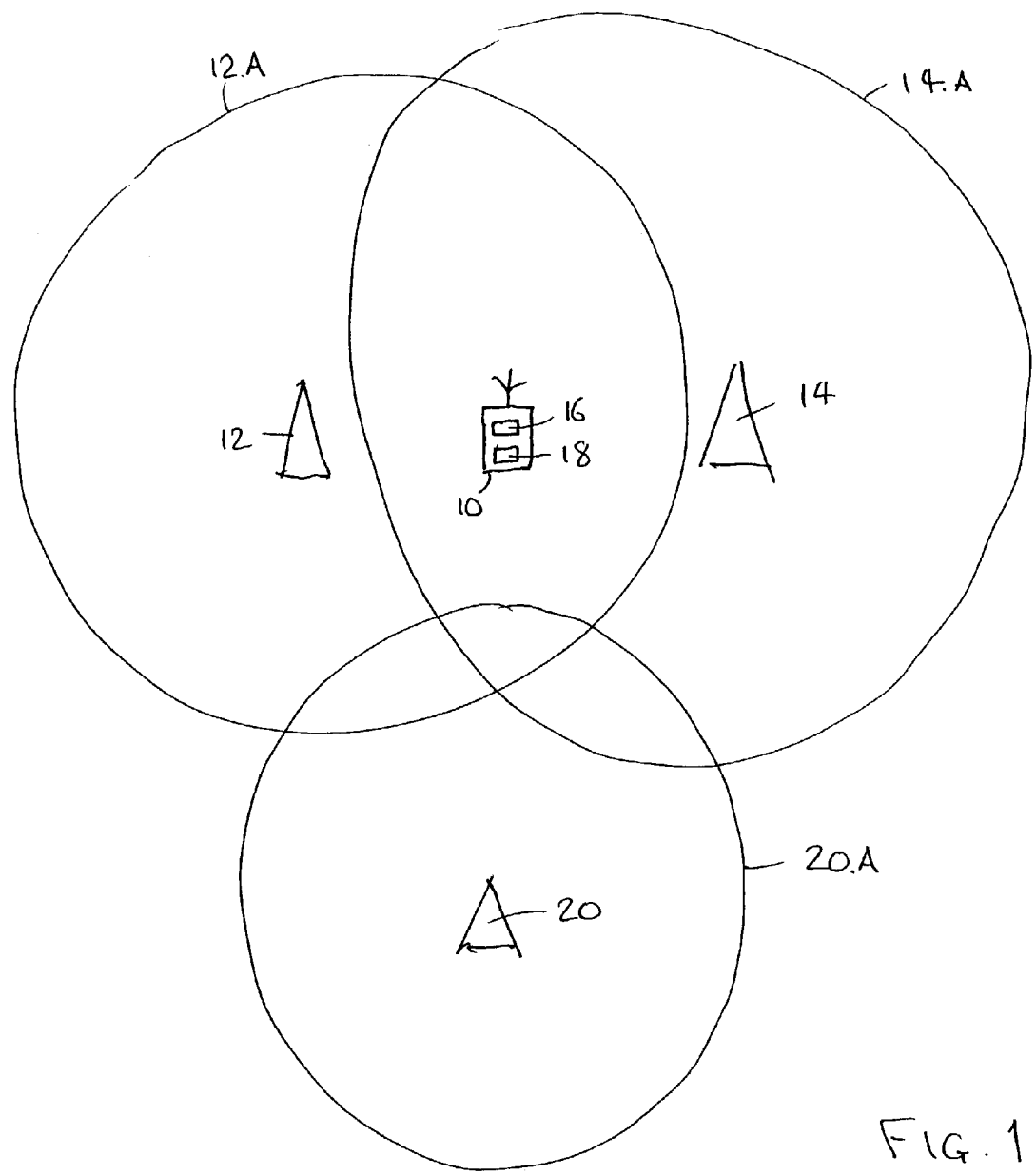

The present invention relates to methods for power saving in portable or mobile communications apparatuses, in particular those configured and operable to receive data transmitted from fixed transmitters having a geographically restricted broadcast range (hereinafter generically referred to as beacons). The invention further relates to such apparatuses constructed or controlled to effect such methods.

Enhancing the functionality of portable devices such as mobile telephones and personal digital assistants (PDA's) is increasingly a goal of the consumer electronics industry, with such devices being regularly carried and utilised by their owners. One example of this is the addition of (generally wireless) communications facilities that allow such devices to communicate with sources of additional data that the user may wish to have access to. In the case of portable telephones, already able to access data via telecommunications networks, such added communications facilities may take the form of a relatively short range wireless capability enabling the device to gather additional data from local beacons making available local data, such as special offers in local retail outlets, details of local events, and so forth. Such short (or longer) range capability is also being added to devices without an existing communications facility, such as PDA's. Examples of such enabled devices, and data delivery infrastructures supporting a variety of services, are given in the present assignees pending applications PCT EP01/06946 and EP01/13015 which are unpublished at the priority date of the present application.

Suitable protocols for data transmission over such additional communications links are readily available, with Bluetooth (Bluetooth is a registered trademark of Ericsson), 802.11 (in conventional and short range implementations), RFLite, and 802.15 being known RF (radio frequency) implementations, and IrDA being an example of a suitable short range link via infra red.

The mechanisms for establishing connection between a mobile device and a beacon will generally vary according to the protocol being followed: for example, a mechanism may involve an exchange of messages between mobile device and beacon to establish a full connection, or the mobile device may simply pick up data/messages that are being broadcast (with no access controls) from a beacon to all mobile devices within the broadcast range of that beacon.

A problem that arises is that the mobile device is generally battery powered, and that battery power will be seriously reduced if the mobile device is required to continuously monitor the RF or IR (or other wireless connection means) environment to detect the presence of a beacon delivering data that the user of the mobile device may wish to have access to.

It is therefore an object of the present invention to provide a means whereby power loss from monitoring for beacons is diminished.

In accordance with a first aspect of the present invention, there is provided a method for power saving in a mobile device for use in conjunction with a plurality of beacon devices, wherein said mobile device detects and receives data from such beacon devices including a first one of said beacon devices when said mobile device is at a first location within a first predetermined distance from said first one of said beacon devices, and said mobile device detects movement thereof; wherein, having detected said first one of said beacon devices, said mobile device is disabled from detecting such beacon devices until said device has determined that it has moved from said first location. By restricting the beacon detection scheme to determination after the device has moved from a first location where no determination occurred, wasteful power usage is avoided in locations where there is no beacon to be detected.

The mobile device may determine the distance it has travelled, and communications may be disabled until said mobile device has travelled at least a second predetermined distance from the first location. In this way, a mobile device which barely moves may be prevented from wastefully searching for beacons when any movement is minor and insufficient to be likely to have moved to a location where new beacons may be encountered.

Also in accordance with the present invention there is provided a mobile device for use in conjunction with a plurality of beacon devices, said mobile device including:

communications means operable to detect and receive data from such beacon devices including a first one of said beacon devices when said mobile device is at a first location within a first predetermined distance from said first one of said beacon devices; and detector means operable to detect movement of said mobile device;

wherein, said communications means having detected said first one of said beacon devices, said communications means are disabled from detecting such beacon devices until said detector means determine that said mobile device has moved from said first location.

Said detector means may be operable to determine distance travelled by said mobile device, and said communications means is disabled until said mobile device has travelled at least a second predetermined distance from said first location. The detector means may be operable to determine distance travelled by said mobile device through received signal strength in data transmissions from a detected one of said beacons. Alternately, the communications means may be operable to detect signals from two or more of said beacons, with the detector means operable to determine distance travelled through changes in received signal strength in the signals received from said two or more beacons. In such an arrangement, triangulation or other known techniques may be used to determine whether (and to what extent) the device has moved.

The device, having said communications means, may have additional communications means operable to enable said mobile device to establish communications via an alternative means to said communications means. Said communications means may be operable to exchange data via RF link.

The present invention further comprises a communications system comprising a mobile device as recited above, and a plurality of said beacon devices.

Further features and advantages of the present invention will become apparent from reading of the following description of preferred embodiments, given by way of example only, and with reference to the accompanying Figure which shows a mobile device receiving signals from two beacons.

The FIGURE illustrates a method for power saving in a mobile device 10 for use in conjunction with an array of beacon devices 12, 14, 20, the mobile device including a communications stage 16 operable to at least receive messages broadcast from a beacon 12,14, with such communications suitably complying with a known communications protocol such as Bluetooth or 802.11. As shown, the mobile device 10 is in a position to receive data messages from beacons 12 and 14, but outside the broadcast range (illustrated at 20A) of beacon 20, so that scanning for beacon messages from that beacon will produce a negative result.

The mobile device further comprises a movement detector stage 18 which may take a number of forms, and detects whether the mobile device has significantly (to within a predetermined distance or extent) changed its location since it last detected beacons 12, 14. The detection may be through periodic checks in received signal strength from one or both of the beacons 12, 14, or by relative signal timings for the signals from the two beacons.

If the detector indicates that the mobile device has not moved significantly, the communications stage 16 is inhibited from scanning for further beacon signals, thereby saving battery power for the mobile device.

From reading the present disclosure, other modifications will be apparent to persons skilled in the art. Such modifications may involve other features which are already known in the design, manufacture and use of communications systems and/or data network access apparatus and devices and component parts thereof and which may be used instead of or in addition to features already described herein.

What is claimed is:

1. A method for power saving in a mobile device for use in conjunction with a plurality of beacon devices, comprising:

said mobile device detecting and receiving data from such beacon devices including a first one of said beacon devices when said mobile device is at a first location within a first predetermined distance from said first one of said beacon devices, and said mobile device detecting movement thereof;

wherein, having detected said first one of said beacon devices, disabling the mobile device from detecting such beacon devices until said mobile device has determined that it has moved from said first location.

2. A method as claimed in claim 1, further comprising said mobile device determining the distance it has travelled, and communications remain disabled until said mobile device has travelled at least a second predetermined distance from said first location.

3. A mobile device for use in conjunction with a plurality of beacon devices, said mobile device including:

a first communications means operable to detect and receive data from such beacon devices including a first one of said beacon devices when said mobile device is at a first location within a first predetermined distance from said first one of said beacon devices; and detector means operable to detect movement of said mobile device;

wherein, said first communications means having detected said first one of said beacon devices, said first communications means are disabled from detecting such beacon devices until said detector means determine that said mobile device has moved from said first location.

4. A mobile device as claimed in claim 3, wherein said detector means is operable to determine distance travelled by said mobile device, and said first communications means is disabled until said mobile device has travelled at least a second predetermined distance from said first location.

5. A mobile device as claimed in claim 4, wherein said first communications means are operable to detect signals from two or mote of said beacons, and said detector means is operable to determine distance travelled through changes in received signal strength in the signals received from said two or more beacons.

6. A mobile device as claimed in claim 3, wherein said detector means is operable to determine distance travelled by said mobile device through received signal strength in data transmissions from a detected one of said beacons.

7. A mobile device as claimed in claim 3, having said first communications means and a second communications means.

8. A mobile device as claimed in claim 3, wherein said first communications means is operable to exchange data via RF link.

9. A communications system comprising a mobile device as claimed in claim 3, and a plurality of said beacon devices.

* * * * *